(12) United States Patent
Horn

(10) Patent No.: US 7,526,273 B2
(45) Date of Patent: Apr. 28, 2009

(54) METHOD AND APPARATUS TO COUNTER THE ROGUE SHELL THREAT BY MEANS OF LOCAL KEY DERIVATION

(75) Inventor: Guenther Horn, Munich (DE)

(73) Assignee: Nokia Siemens Networks GmbH & Co. KG, Munich (DE)

( * ) Notice: Subject to any disclaimer, the term of this patent is extended or adjusted under 35 U.S.C. 154(b) by 1032 days.

(21) Appl. No.: 10/432,717

(22) PCT Filed: Nov. 5, 2001

(86) PCT No.: PCT/EP01/12783

§ 371 (c)(1),
(2), (4) Date: May 27, 2003

(87) PCT Pub. No.: WO02/43425

PCT Pub. Date: May 30, 2002

(65) Prior Publication Data

US 2004/0102181 A1 May 27, 2004

(30) Foreign Application Priority Data

Nov. 27, 2000 (EP) .................................. 00125913

(51) Int. Cl.
*H04M 1/66* (2006.01)
(52) U.S. Cl. ...................... 455/410; 455/411
(58) Field of Classification Search ................ 455/410, 455/411; 370/252, 338; 714/748; 380/21
See application file for complete search history.

(56) References Cited

U.S. PATENT DOCUMENTS 5,991,405 A * 11/1999 Mills .......................... 380/247

(Continued)

OTHER PUBLICATIONS

M. Marcovici et al., "Enhanced Local Authentication for a 3G Mobile," Lucent Technologies Inc., Kananaskis, Canada, pp. 1-12, Aug. 15, 2000.

(Continued)

*Primary Examiner*—Lester Kincaid
*Assistant Examiner*—Phuoc Doan
(74) *Attorney, Agent, or Firm*—K&L Gates

(57) ABSTRACT

The invention concerns countering a rogue shell threat in a cellular mobile communication system by an apparatus or a method for authentication in a mobile communication system comprising a mobile communication network (VLR/SGSN/HLR/RNC . . . ) and mobile stations (MS) wherein the network provides a service to a mobile station (MS) after authentication of the mobile station wherein the mobile station (MS) comprises a portable module (USIM) wherein the mobile station (MS) comprises a mobile equipment (ME) that is able to communicate with the network and that is able to communicate with the portable module (USIM) wherein the network sends random data (RAND) to the mobile station (MS) wherein the network (AUC, SGSN) calculates response data (XRES(i)) and key data (CK, IK) at least from the random data (RAND) and/or from a key (K) stored in the network (AUC/HLR) wherein the portable module (USIM) of the mobile station (MS) calculates response data (RES(i)) and key data (CK, IK) at least from the random data (RAND) and/or from a key (K) stored in the portable module (USIM) wherein the portable module (USIM) stores the calculated key data (CK, IK) wherein the portable module (USIM) transmits the response data (RES) to the mobile equipment (ME) which (ME) sends response data (RES) to the network wherein the portable module calculates further key data (CSK, ISK) from random data (RAND) and/or from the calculated key data (CK, IK).

8 Claims, 2 Drawing Sheets

U.S. PATENT DOCUMENTS

Figure 1:
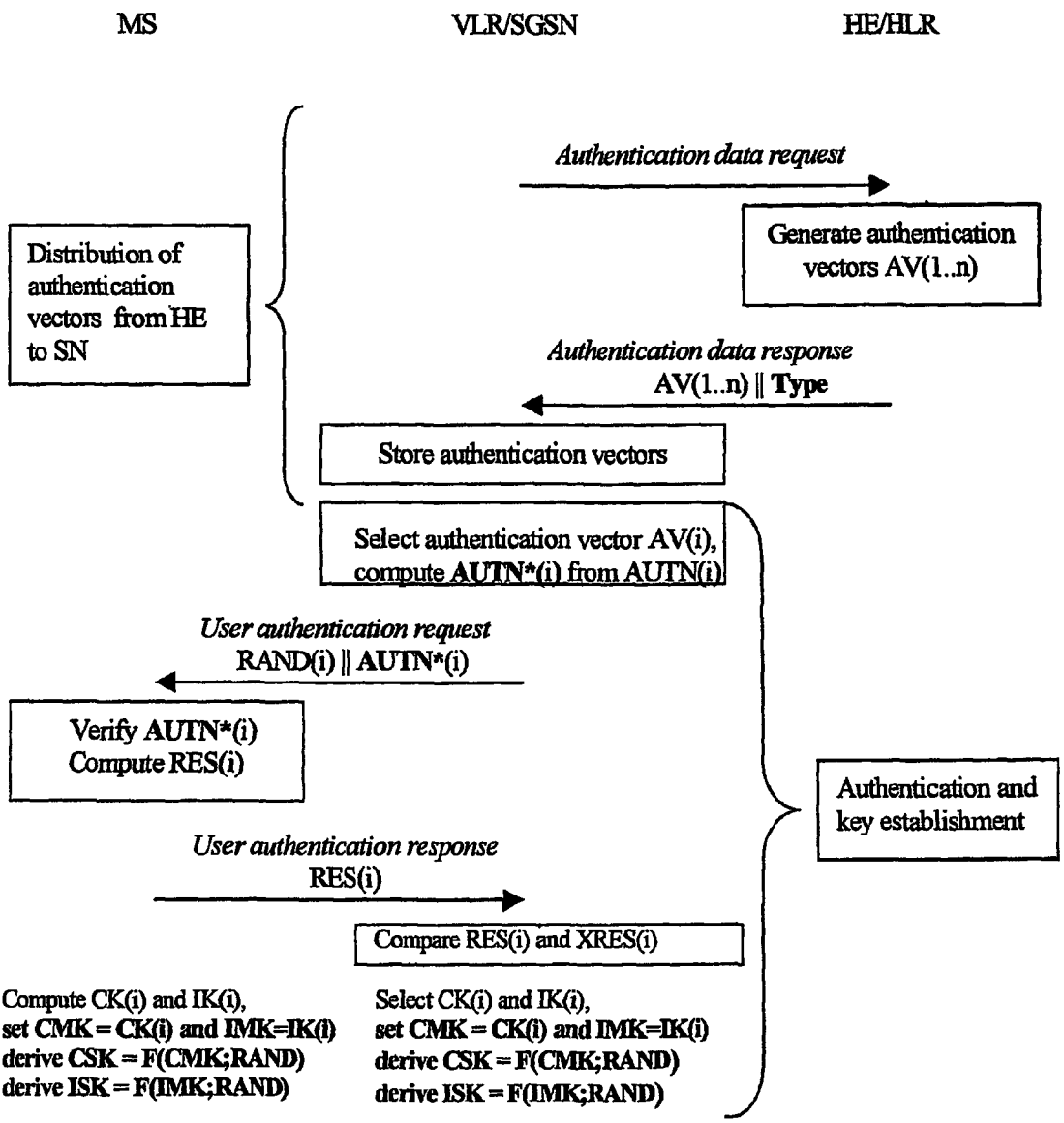

| | | | |
|---|---|---|---|
| 6,711,400 B1 * | 3/2004 | Aura | 455/411 |
| 2002/0044552 A1 * | 4/2002 | Vialen et al. | 370/389 |
| 2002/0091933 A1 * | 7/2002 | Quick et al. | 713/182 |
| 2004/0102181 A1 * | 5/2004 | Horn | 455/410 |

OTHER PUBLICATIONS

G. Horn et al., "Towards a UMTS Security Architecture," 3rd Genneration Partnership Project, pp. 495-500.

* cited by examiner local key derivation procedure:

METHOD AND APPARATUS TO COUNTER THE ROGUE SHELL THREAT BY MEANS OF LOCAL KEY DERIVATION

A problem in communications systems in general is to make sure that only those parties authorised to use the resources of the communications system can actually use it. In this context, it is crucial to authenticate a communicating party, i.e. to corroborate the identity of the party by means of entity authentication. The corroborated identity may then be used in an access control mechanism (e.g. an access control list) to check which resources the party is authorised to use.

If the communication channel may be assumed to be secure (e.g. a fixed telephone line) then entity authentication may suffice to assure a party of another party's identity over the duration of a communication session. If, however, the communication channel may not be assumed to be secure (e.g. a mobile radio link or a link in the Internet) then an attacker could potentially "hijack" the channel, i.e. start to use the channel instead of the authorised party, without the other party noticing, after the completion of the entity authentication procedure.

Consequently, in the case of an insecure communication channel additional security measures are needed for continued assurance of a communicating party's identity during the session. Such additional security measures are the derivation of cryptographic session keys in conjunction with entity authentication and the use of these session keys in cryptographic algorithms to provide confidentiality and/or integrity protection of the communication channel. Confidentiality ensures that no unauthorised party can eavesdrop on the communication, and integrity ensures that no unauthorised party can modify the communication unnoticed. The communicating party's identity during the session is then continually assured by the use of the session keys. This holds under the assumption that only the authorised party can know the session keys.

This assumption depends on several factors, among them most prominently the strength and secure storage and execution of cryptographic algorithms and the secure storage of cryptographic keys.

The present invention applies to a situation where a communicating party, called the user, uses a communication device which consists of two components: a communication terminal and a user security module. The latter is a personal security device associated with the user which, among other functions, is used to store long-term cryptographic keys and store and execute cryptographic algorithms. To protect these cryptographic keys and algorithms, the user security module is typically implemented on a tamper-resistant hardware module. The communication terminal, on the other hand, enjoys only a considerably lower degree of protection against tampering. It is not permanently associated with a particular user. In the situation to which the invention applies the user security module is removable from the communication terminal and may be inserted in another communication terminal, making the second communication terminal the personal terminal of the user as long as the user security module remains inserted. Examples of such user security modules are the SIM module in GSM, the USIM module in UMTS and the WIM module in WAP. Examples of such communication terminals are the Mobile Equipment (ME) in GSM and UMTS and communication terminals supporting WAP.

In the situation to which the invention applies the cryptographic session keys used for confidentiality and/or integrity are derived jointly with entity authentication from one (or more) long-term cryptographic key(s) stored on the user security module. This session key derivation process can only be successfully performed by the user security module. The derived session keys are then transferred from the user security module to the communication terminal. (This transfer is motivated by performance considerations. It is more efficient to execute the confidentiality and/or integrity algorithms which use the session keys in the communication terminal.) When the user security module is removed from the communication terminal the latter is required to delete the session keys.

The problem which arises from the unavoidable transfer of the session keys to the communication terminal is the following: the continuous use of the session keys during the session is meant to continually ensure the communicating party's identity to the other party. But if the user security module is removed from the communication terminal and the latter is a rogue terminal not behaving according to the specifications the rogue terminal may decide to keep the session keys rather than delete them. If this occurs then the other party has no way of telling that the user is no longer associated with the communication terminal because the latter continues to use the session keys. An attacker in control of the rogue terminal may then use communication resources in the name of the user without the user knowing. This attack is also known as the rogue shell attack.

It is an object of the invention to avoid said rogue shell attack. The object of the invention is solved by the invention according to the independent claims. The invention can be used in any mobile communication network, especially in a cellular mobile communication network.

The invention applies to a situation where a) it is costly to perform the entity authentication and key derivation procedure based on the long-term key in the user security module, and, therefore, it is advantageous to reduce the number of times this procedure has to be performed;

b) full backward compatibility with communication devices and other entities in the communication system which do not support the new feature described in the invention is desired.

Herein:

a) may apply when, in a mobile communications system, the entity authentication and key derivation procedure for a user roaming in a visited network involves signalling back to the home network.

b) may apply when a new feature to counter the rogue shell attack is introduced in an existing mobile communications system such as GSM, UMTS, ANSI IS-41 or a system defined by 3GPP2.

This invention presents a new way to counter the rogue shell attack in a situation where a) and, possibly in addition, b) hold.

Basically three approaches to deal with the rogue shell attack can be imagined:

1. Assume that most communication terminals are in fact personal devices of the user and that the user security module is relatively rarely removed and inserted in other communication terminals. If in such relatively rare cases rogue shell attacks occur one trusts that the attack can be detected and consequently countered by fraud control measures.

2. Perform the entity authentication and key derivation procedure with sufficient frequency so as to limit the lifetime of session keys and, consequently, limit the period during which fraud can be committed through unauthorised use of the session keys. The frequency must, of course, be sufficiently low so as not to incur unbearable costs.

3. Introduce a secondary authentication and key derivation procedure which is less costly to perform than the primary entity authentication and key derivation procedure. This secondary procedure is assumed, however, to not offer the same degree of security as the primary procedure for which reason the primary procedure still needs to be performed from time to time, but with reduced frequency.

In mobile communication networks, e.g. in GSM, a mixture of approaches 1 and 2 is applied. In UMTS Release' 99, also a mixture of approaches 1 and 2 is expected to be applied.

The use of secondary authentication and key derivation procedures for different objects (to reduce the cost of the primary procedure) is known from prior art in different fields of technology, among them TETRA (Terrestrial Trunked Radio (TETRA), Voice plus Data (V+D): Part 7: Security; Edition 2f, November 1998), from DECT (ETS 300175-7, DECT Common Interface, Part 7: Security Features, European Telecommunications Standards Institute, 1992) and IS-41 (TIA/EIA, PN 2991: Cellular radio telecommunications intersystem operations IS-41 Rev. D; May 4, 1995). They were not known or used in these systems, however, for the purpose of countering the rogue shell attack.

Recently, the use of secondary authentication and key derivation procedures to counter the rogue shell attack in 3GPP (UMTS) and 3GPP2 systems has been proposed in contributions to standards bodies, cf. [Lucent] (=Lucent Technologies Inc, M. Marcovici, S. Mizikovsky: Enhanced local authentication of a 3G mobile, TR45AHAG/00.09.12.15, Washington, D.C., Sep. 12, 2000) and [Qualcomm] (=F. Quick, J. Nasielski: Proposed security enhancement to AKA, TR45AHAG/2000.06.20., Ottawa, Canada, Jun. 20, 2000-11-23). Both solutions modify, in different ways, key material which results from the primary key derivation procedure and use the modified key material as intermediate keys which are input to the secondary authentication and key derivation procedure.

INVENTION

Functional entities supporting the new feature described in the invention are called "new" here, and others not supporting it are called "old" here.

The principles followed by the invention are:
Introduce a secondary authentication and key derivation procedure as in section 2.3 above
Minimize the changes required to existing systems
Re-use as much as possible protocol elements of the primary authentication and key derivation procedure
Allow communication between old and new entities.
We consider two different situations:
The general situation where a user with a communication device consisting of a communication terminal and a user security module communicates with a second party in a communications system;
A specific situation where the communications system is a mobile communications system consisting of the following components:
a mobile station consisting of a mobile equipment and a user security module;
a base station system;
a visited network node;
a home network node.

In both situations, the communication terminal is not affected by the introduction of the new feature.

In the general situation, the following holds for the solution given in the invention:

the second party has a means to determine whether the user security module is old or new; this means need not involve the user;

the second party signals to a new user security module that it is new by applying a cryptographic function to a parameter in the first message and possibly further data in the primary authentication and key derivation procedure in a specific way; the cryptographic function may be a hash function or an encryption function; except for the modification of the parameter in the first message, the information flow, message format and contents of the primary authentication and key derivation procedure may remain unchanged;

when the user security module learns that the second party is new it decides to use a secondary authentication and key derivation procedure; the keys derived in the primary procedure (with the parameter in the first message modified) are then used as intermediate keys in the secondary procedure; the intermediate keys are not transferred to the communication terminal;

when the user security module learns that the second party is old by detecting that the first message in the primary authentication and key derivation procedure was unmodified, it decides to use the keys derived in the primary procedure as session keys and transfers them to the communication terminal;

This procedure for new user security modules and new second parties to agree on the use of a secondary authentication and key derivation procedure and derive intermediate keys for use in this secondary procedure may apply to any secondary authentication and key derivation procedure.

The invention also defines the use of a particular secondary procedure which best fits the principles of the solution stated above.

This particular secondary authentication and key derivation procedure consists in a reduced version of the primary procedure where the information flow and all message formats are identical in the primary and secondary procedure, but where parts of the message content are substituted with pre-defined fixed values or other parameters, possibly derived by non-cryptographic means.

In the specific situation, in addition, the following holds for the solution given in the invention:

the base station system is not affected by the introduction of the new feature;

the second party is the visited network node;

the means for the second party to determine whether the user security module is old or new is a particular parameter sent by the home network node; this parameter may be sent in response to a request by the visited network node for user authentication data;

the only modification for a home network node required to support the new feature is the capability of sending the information on the type of user security module (old or new) in the particular parameter; the generation and format of user authentication data remains unchanged;

the further data to which the cryptographic function is possibly applied when the second party signals to a new user security module that it is new may be part of the user authentication data, in particular a derived key contained in the user authentication data;

the particular secondary authentication and key derivation procedure may involve sending part of the user authentication data containing a random challenge to the mobile station; the random challenge would then be input to the secondary key derivation procedure together with the intermediate key.

General advantages of the solution presented in this invention are:
- the cost involved in frequently running a primary entity authentication and key derivation procedure is reduced;
- it allows communication between old and new entities; full backward compatibility is provided;
- it minimizes the changes required to existing systems;
- it re-uses as much as possible protocol elements of the primary authentication and key derivation procedure;
- it provides a means to modify the primary authentication and key derivation procedure in a simple way so that it can be used as a secondary procedure;
- the communication terminal is not affected by the introduction of the new secondary authentication and key derivation procedure;
- in the specific situation to which this invention applies the mobile equipment and the base station system are not affected by the introduction of the new secondary authentication and key derivation procedure.

Advantages over the solution presented in [Qualcomm]:
- In the solution in [Qualcomm], for the purpose of backward compatibility it is required that the home network node generates different types of user authentication data in real-time, depending on the type of visited network node (old or new). This is unnecessary in the solution presented here.
  - The solution in [Qualcomm] does not say anything about how the different entities learn whether they are old or new. The solution presented in this invention provides a mechanism for this.
- The solution in [Qualcomm] envisages that the use of the secondary authentication and key derivation procedure depends on support of the ME which the solution presented in this invention does not.

Advantages over the solution presented in [Lucent]:
- The part of the Lucent solution relying on the use of the anonymity key AK does not seem to work as described in [Lucent] as it seems to rest on the assumption that AK has 128 bits whereas it has only 48 bits in the discussed use in UMTS. Furthermore, the AK is not known to the visited network node.
- If the anonymity key AK cannot be used by the visited network node in the Lucent solution then different procedures to compute user authentication data are required to include a so-called LAK (intermediate key). In this case, or if AK has to be transferred from the home network node, a different format of the user authentication data is required and the interface between the visited and the home network node needs to be changed. This is not required in the solution presented here.
- There are two alternatives in the Lucent solution for the secondary authentication and key derivation procedure. Alternative 1 in the Lucent solution does not provide a security level comparable to the solution presented in this invention as the same key IK continues to be used between two runs of the primary authentication procedure. Alternative 2 in the Lucent solution affects both ME and base station system which the solution presented here does not.

The invention contains recognising that the information flows and message formats of the primary authentication and key derivation procedure could be maintained while only slightly modifying message contents to obtain the following additional features:
- signalling from a new visited network node to a new user security module that the former is new;
- providing a means for the user security module and the visited network node to derive intermediate keys;
- providing a secondary authentication and key derivation procedure;

It was further recognised that
- it is not necessary to modify the way the home network node generates user authentication data in order to support backward compatibility;
- the rogue shell threat can be countered without affecting the communication terminal/mobile equipment and the base station system at all;
- it is possible for the second party to signal to a new user security module that it is new by applying a cryptographic function to the first message and possibly further data in the primary authentication and key derivation procedure;
- the keys derived in the (modified) primary authentication and key derivation procedure can be used as intermediate keys in the secondary authentication and key derivation procedure;
- it is possible for the second party to signal to a new user security module that it is new by applying a cryptographic function to the first message and possibly further data in the primary authentication and key derivation procedure.

Further advantages of the invention appear from the claims and the following description of an example for carrying out the invention.

FIG. 1 shows a primary entity authentication and key derivation procedure, combined with a secondary authentication and and key derivation procedure (local key derivation procedure)

Figure 2:
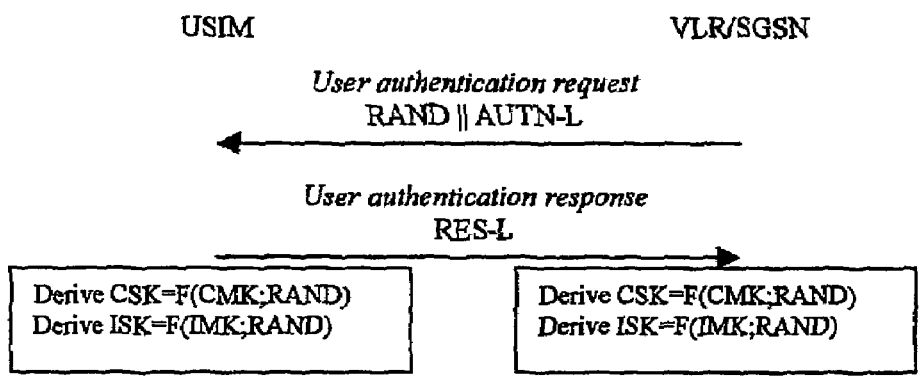

FIG. 2 shows a local key derivation procedure not combined with a primary entity authentication and key derivation procedure In the example for carrying out the invention, the feasibility of the invention is demonstrated by applying it to the Universal Mobile Telecommunications System (UMTS), as standardised by 3GPP. For the security architecture, compare [SecArch=3G TS 33.102 3rd Generation Partnership Project; Technical Specification Group Services and System Aspects; 3G Security; Security Architecture (Release 1999), version 3.6.0, October 2000].

In the description of the example for carrying out the invention, the specialised terminology known from UMTS is used because, otherwise, it may be more difficult to see the impact of the invention in the context of UMTS for somebody comparing the invention with the current UMTS specifications in [SecArch].

The terminology known from UMTS relates to the more general terminology used in the description of this invention above as follows:

Terminology used in the description of this invention→Terminology used in UMTS
visited network node→VLR/SGSN
home network node→HLR/AuC
base station system→RNC
communication device→mobile station (MS)
mobile equipment→mobile equipment (ME)
user security module→USIM
primary authentication and key derivation procedure→UMTS authentication and key agreement procedure (UMTS AKA)
secondary authentication and key derivation procedure→local key derivation procedure (not known from [SecArch])
intermediate key→master key (not known from [SecArch])

authentication data→authentication vector (AV)

MAP is a protocol used in UMTS to carry authentication related information between the HLR/AuC and the VLR/SGSN MAC stands for Message Authentication Code.

DETAILED DESCRIPTION OF AN EXAMPLE FOR CARRYING OUT THE INVENTION

There are four main elements to the solution presented in this invention:
  a mechanism to signal from the HLR/AuC to the VLR/SGSN that the USIM supports the local authentication procedure;
  a mechanism to signal from the VLR/SGSN to the USIM that the VLR/SGSN is running the local key derivation procedure: this is based on a specific modification by the VLR/SGSN of the user authentication request in a UMTS AKA which the USIM can recognise;
  a procedure to derive the cipher and integrity master keys CMK and IMK from the permanent key K: this is realised using the UMTS AKA;
  a procedure to derive the cipher and integrity session keys CSK and ISK from the cipher and integrity master keys CMK and IMK: this is realised using a stripped down version of the UMTSAKA.

These four elements are described in detail in the following. Their realisation is based on the following ideas:

Mechanism to signal from the HLR/AuC to the VLR/SGSN that the USIM supports the local key derivation procedure A new HLR/AuC always includes a flag in its responses to Send Authentication Info MAP messages which indicates whether the USIM is new or old. Backwards compatibility is achieved by using well-known techniques commonly used to introduce extensions to MAP.

No further changes to the HLR/AuC are required. In particular, the process of generating authentication vectors is as specified in [SecArch].

Mechanism to signal from the VLR/SGSN to the USIM that the VLR/SGSN supports the local authentication procedure New VLRs/SGSNs and new USIMs have a standardised encryption function Enc which operates on 64 bit blocks and has a 128 bit key.

When a new VLR/SGSN has received (together with an authentication vector) the indication from the HLR/AuC that the USIM is new, and it wants to use the local key derivation procedure then it sends a modified User Authentication Request message containing (RAND, AUTN*), cf. [SecArch, section 6.3.3]. AUTN* differs from AUTN in that the MAC-parameter is encrypted with CK, i.e.

$$AUTN^* = SQN \oplus AK \| AMF \| Enc_{CK}(MAC).$$

When a new USIM receives the parameters contained in the User Authentication Request message it proceeds as specified in [SecArch, section 6.3.3] to compute AK, MAC, RES, CK, IK. The USIM then compares the computed MAC with the received MAC.
  When the computed MAC and the received MAC match the USIM continues as specified in [SecArch, section 6.3.3], and no local key derivation procedure is used. In particular, CK and IK are transferred to the ME after successful authentication.
  When the computed MAC and the received MAC do not match the USIM encrypts the computed MAC with CK and compares it to the received MAC. When there is a match now, the USIM determines that the local key derivation procedure is run and proceeds as described further below.
  When there is still no match the USIM reports authentication failure to the ME.

Procedure to Derive the Integrity Master Key IMK from the Permanent Key K
  When the USIM has determined that the local key derivation procedure is run CK and IK are not transferred to the ME, but remain in the USIM. CK becomes the cipher master key CMK and IK becomes the integrity master key IMK. Cipher and integrity session keys CSK and ISK are derived from CMK and IMK according to the procedure described below. Then the authentication procedure is continued as specified in [SecArch].
  When the VLR/SGSN initiated a local key derivation procedure and receives the correct RES it proceeds to set CMK:=CK and IMK:=IK.

Procedure to derive the cipher and integrity session keys CSK and ISK from the cipher and integrity master keys CMK and IMK (local key derivation procedure)

The purpose of the local key derivation is to prove the presence of the USIM by having the USIM derive new session keys.

Both new USIMs and new VLR/SGSNs possess a standardised key derivation function F.

Two cases need to be distinguished:
  Case A: derivation of cipher and integrity session keys for the first time after the establishment of cipher and integrity master keys;
  Case B: derivation of cipher and integrity session keys for the second or later times after the establishment of cipher and integrity master keys.

Case A:
  the USIM and the VLR/SGSN compute CSK=F(CMK; RAND) and ISK=F(IMK; RAND) where RAND is the parameter contained in the User Authentication Request message and used to derive CMK and IMK according to the description above. F is a key derivation function, i.e. a cryptographic function with special properties suitable to derive cryptographic new keys from existing cryptographic keys.
  The USIM then transfers CSK and ISK to the ME. The VLR/SGSN transfers CSK and ISK to the RNC in the security mode set-up procedure. The ME and the RNC continue as specified for a run of the UMTS AKA in [SecArch].

Case B:
  Whenever the VLR/SGSN determines that new CSR and ISK need to be derived and the lifetimes of CMK and IMK have not expired it sends a modified User Authentication Request message to the MS containing (RAND, AUTN-L). RAND is a nonce generated by the VLR/SGSN and AUTN-L is equal to a pre-defined fixed value to signal to the USIM that a local key derivation procedure is run, and not a UMTS AKA.
  The ME cannot distinguish a run of the local key derivation procedure from a run of the UMTS AKA and behaves accordingly during the entire procedure.
  When the USIM detects that the received AUTN equals the fixed value AUTN-L and it determines that the lifetimes of CMK and IMK have not expired it returns a RES-L equal to a pre-defined fixed value and computes the session keys as CSK=F(CMK; RAND) and ISK=F(IMK; RAND).
  The USIM then transfers CSK and ISK to the ME.

After receiving the correct response RES-L from the MS, the VLR/SGSN computes the session keys as CSK=F(CMK; RAND) and ISK=F(IMK; RAND) and transfers CSK and ISK to the RNC in the security mode set-up procedure.

When the USIM determines that the lifetimes of CMK and IMK have expired it sends a RES equal to a different pre-defined fixed value back to the VLR/SGSN.

When the lifetimes of CMK and IMK have expired the VLR/SGSN inititates a run of the UMTS AKA to establish new CMK and IMK.

The invention claimed is:

1. A method for authentication in a mobile communication system having a mobile communication network and mobile stations, comprising:

providing a service, by the network, to one of the mobile stations after authentication of the mobile station, wherein the mobile station comprises a portable module and mobile equipment configured to communicate with the mobile communication network and configured to communicate with the portable module;

sending, by the network, random data to the mobile station;

calculating, via the network, response data and key data from at least one of random data and a key stored in the network;

calculating, via the portable module of the mobile station, response data and key data from at least one of random data and a key stored in the portable module, wherein the portable module stores the calculated key data;

transmitting, via the portable module, the response data to the mobile equipment which sends the response data to the network;

calculating, via the portable module, further key data from at least one of random data and the calculated key data;

transmitting, from the portable module, the further key data to the mobile equipment to enable communication between the mobile equipment and the network for providing a service to the mobile station;

calculating, in the network, further key data from at least one of random data and the calculated key data to enable communication between the network for providing a service to the mobile station and the mobile equipment;

comparing via the network at least the response data from the mobile equipment and the response data calculated in the network during the authentication procedure, wherein a second authentication procedure is executed after authentication of the mobile station for checking whether the portable module is connected to the mobile equipment;

sending, from the network, random data to the mobile station;

calculating, via the portable module, new further key data from at least one of the random data and the stored key data that was calculated during authentication of the mobile station, wherein the network also calculates the new further key data from at least one of the random data and the stored key data that was calculated during authentication of the mobile station, wherein the new further key data is used for communication between the mobile equipment and the network.

2. The method according to claim 1, wherein the network does not compare the response data from the mobile equipment and the response data calculated in the network during the second authentication procedure.

3. The method according to claim 1, wherein the mobile station the portable module stores the key data and the portable module does not transfer the key data to the mobile equipment.

4. The method according to claim 1, wherein the portable module transfers further key data calculated from key data to the mobile equipment if it receives command data from a network element indicating that the network is able to calculate the further key data.

5. The method according to claim 4, wherein a network element transfers command data to the portable card if the network has detected that the portable card is able to calculate the said further key data.

6. The method according to claim 1, wherein a network element transfers the command data to the portable card and is sent in the form of command data requesting calculating key data wherein the command data is interpreted by a portable module that is not able to calculate further key data as a command to calculate key data.

7. The method according to claim 1, wherein the network determines that the portable module is connected to the mobile equipment by sending challenge data to the mobile station requiring answer data, calculated using further key data, from the mobile station and compares the response data transmitted from the mobile station with response data calculated in the network.

8. The method according to claim 1, wherein the portable module transfers the key data to the mobile equipment if the portable module is not able to calculate further key data and that the key data is used for communication between the mobile equipment and the network.

* * * * *